United States Patent
Backmann et al.

(10) Patent No.: US 12,459,186 B2
(45) Date of Patent: Nov. 4, 2025

(54) METHOD FOR A MODEL-BASED OPTIMIZATION OF A FILM PRODUCT DURING A PRODUCTION ON A FILM EXTRUSION LINE

(71) Applicant: Windmöller & Hölscher KG, Lengerich (DE)

(72) Inventors: Martin Backmann, Lengerich (DE); Markus Bussmann, Lengerich (DE); Melanie Schuh, Lengerich (DE); Lennart Ederleh, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 585 days.

(21) Appl. No.: 17/768,917

(22) PCT Filed: Oct. 8, 2020

(86) PCT No.: PCT/EP2020/078239
§ 371 (c)(1),
(2) Date: Apr. 14, 2022

(87) PCT Pub. No.: WO2021/073999
PCT Pub. Date: Apr. 22, 2021

(65) Prior Publication Data
US 2023/0330909 A1     Oct. 19, 2023

(30) Foreign Application Priority Data
Oct. 14, 2019   (DE) .................. 10 2019 127 550.4

(51) Int. Cl.
*B29C 48/92* (2019.01)
*B29C 48/08* (2019.01)
*G05B 13/04* (2006.01)

(52) U.S. Cl.
CPC ............... *B29C 48/92* (2019.02); *B29C 48/08* (2019.02); *G05B 13/042* (2013.01)

(58) Field of Classification Search
CPC ....... B29C 48/92; B29C 48/08; G05B 13/042; G05B 19/41885; Y02P 90/02
See application file for complete search history.

(56) References Cited

U.S. PATENT DOCUMENTS 9,046,885 B2 * 6/2015 Johannaber ........ G05B 19/0426
10,877,654 B1 * 12/2020 Speare .................... G06F 9/451
(Continued)

FOREIGN PATENT DOCUMENTS

EP           1441268        7/2004
WO    WO 2018/072773       4/2018

OTHER PUBLICATIONS

Internationaler Recherchenbericht und Schriftlicher Bescheid [International Search Report and the Written Opinion] Dated Jan. 15, 2021 From the International Searching Authority Re. Application No. PCT/EP2020/078239 and Its Translation of Search Report Into English. (13 Pages).

(Continued)

*Primary Examiner* — Thomas C Lee
*Assistant Examiner* — Tyler Dean Hedrick (57) ABSTRACT

The invention relates to a method for a model-based optimization of a film product during a production on a film extrusion line (10) by means of a production model (PM) of the film extrusion line (10), comprising the following steps:
Acquisition of at least two model parameters (MP) in the form of input parameters (EP) of the production model (PM) for predicting a production situation of the film extrusion line (10) and/or in the form of at least two model parameters (MP) in the form of output parameters (AP) of the production model (PM) for predicting a film product situation of the film extrusion line (10), (Continued)

Forming a parameter relationship between the acquired model parameters (MP) by means of the production model (PM), Prioritize at least one model parameter (MP) of the production model (PM) for optimization, Modifying at least one non-prioritized model parameter (MP) of the production model (PM) based on the formed parameter relationship to optimize the prioritized model parameter (MP).

18 Claims, 4 Drawing Sheets

(56) References Cited

U.S. PATENT DOCUMENTS

| | | | | |
|---|---|---|---|---|
| 11,609,289 | B2* | 3/2023 | Feiweier | G01R 33/3804 |
| 2003/0208287 | A1* | 11/2003 | Kurz | G05B 17/02 |
| | | | | 700/31 |
| 2018/0106675 | A1* | 4/2018 | Yao | G01J 1/4228 |
| 2019/0315037 | A1* | 10/2019 | Schumacher | B29C 48/49 |
| 2022/0236625 | A1* | 7/2022 | Citerin | H04N 23/62 |

OTHER PUBLICATIONS

Manlig "'Optimization' of Manufacturing Processes With Computer Simulation—An Analysis Report" ["'Optimierung' von Fertigungsprozessen mit Rechnersimultation—Ein Analysebericht"], TU Dresden, Germany, IPT, PAS Research Results Report 2001, XP055760666, p. 1-9, Jan. 1, 2001 and English Translation.

International Preliminary Report on Patentability Dated Apr. 28, 2022 From the International Bureau of WIPO Re. Application No. PCT/EP2020/078239 and Its Translation Into English. (15 Pages).

Mitteilung Gemäß Artikel 94(3) EPU [Communication Pursuant to Article 94(3) EPC] Dated Dec. 17, 2024 From the European Patent Office Re. Application No. 20789569.9 and Its Translation Into English. (12 Pages).

* cited by examiner

METHOD FOR A MODEL-BASED OPTIMIZATION OF A FILM PRODUCT DURING A PRODUCTION ON A FILM EXTRUSION LINE

RELATED APPLICATIONS

This application is a National Phase of PCT Patent Application No. PCT/EP2020/078239 having International filing date of Oct. 8, 2020, which claims the benefit of priority of German Patent Application No. 10 2019 127 550.4 filed on Oct. 14, 2019. The contents of the above applications are all incorporated by reference as if fully set forth herein in their entirety.

FIELD AND BACKGROUND OF THE INVENTION

The present invention relates to a method for model-based optimization of a film product during manufacture on a film extrusion line, and to a computer program product for carrying out such a method.

It is known that film extrusion line can be evaluated on the basis of input parameters and output parameters with regard to a production situation and/or with regard to a film product situation. This applies in particular to the setting, i.e. the control and/or the regulation of the film extrusion line. For example, a large number of input parameters are required to set the film extrusion line to produce a defined film product situation. Such input parameters can be, for example, parameters of the raw materials, parameters of the recipe, but also parameters of the film extrusion line itself. The evaluation of the quality of the film product also depends on a large number of parameters. For example, the initial parameter here can be the output parameter, i.e. the actual fulfillment of a function of the film, but also measurable film parameters such as tear strength or stretchability.

Known solutions are based to a large extent on the experience and knowledge of the operating personnel for the control and/or regulation of the film extrusion line. Thus, based on the experience of the operating mode of the film extrusion lines, the operating personnel know which settings have to be made in order to achieve a defined film product or to change, in particular improve, individual result parameters in the film product situation. However, this leads to the fact that with different operating personnel also different and above all not reworkable processes lead to the fact that different film product situations arise. Although this is usually still sufficient in principle to ensure a sufficient level of quality for the film product, a high reject rate is achieved in the event of an error. Especially when switching between different film products, but also when changing operators, there is therefore a high risk that the film product will change in terms of production quality.

It is therefore the object of the present invention to at least partially eliminate the disadvantages described above. In particular, it is the task of the present invention to find and/or improve optimization possibilities for the production of film products on film extrusion lines in a cost-effective and simple manner.

The foregoing problem is solved by a method having the features of claim 1 and a computer program product having the features of claim 14. Further characteristics and details of the invention result from the dependent claims, the description and the drawings. Features and details described in connection with the method according to the invention naturally also apply in connection with the computer program product according to the invention and vice versa in each case, so that reference is or can always be made mutually with regard to the disclosure concerning the individual aspects of the invention.

SUMMARY OF THE INVENTION

According to the invention, a method of a model-based optimization of a film product during a production on a film extrusion line by means of a production model of this film extrusion line is used. Such a method has the following steps:

Acquisition of at least two model parameters in the form of input parameters of the production model for predicting a production situation of the film extrusion line and/or in the form of at least two model parameters in the form of output parameters of the production model for predicting a film product situation of the film extrusion line, Forming a parameter relationship between the acquired model parameters by means of the production model, Prioritize at least one model parameter of the production model for optimization, Modifying at least one non-prioritized model parameter of the production model based on the formed parameter relationship to optimize the prioritized model parameter.

A method according to the invention is now based on the fact that the film extrusion line can be represented in a production model with regard to at least some model parameters. Such a production model may be a simulation model that has an algorithmic part, an empirical model part, and/or an artificial intelligence model part. These different parts of the simulation model can be combined or used alone to provide a production model of a film extrusion line. Such a production model can be created on the basis of known parameter relationships, but also on known training data in the form of production orders already run historically on film extrusion lines. If the production model has a so-called artificial intelligence, such historical data can be used as training data, for example, in a deep learning system for training the production model.

According to the invention, two model parameters of the production model are acquired in a first step. A fundamental distinction must be made as to whether the model parameters represent input parameters or output parameters of the production model. In principle, the optimization method according to the invention can be recorded for input parameters as well as for output parameters. A correlation, i.e. the recording of input parameters and output parameters, is also conceivable in principle within the scope of the present invention.

The recording of the input parameters and the output parameters describes, based on the data of these respective parameters, on the one hand for the input parameters the production situation of the film extrusion line and on the other hand a film product situation of the film extrusion line and there in particular of the film product. A production situation means, for example, values and parameters, but also the basic production stability of the film extrusion line. Film product situation, in the sense of the present invention, is in particular one or more parameters or parameter combinations that make the quality or quantity of the film product assessable.

Now that two or more model parameters of the production model have been acquired, according to the invention, at least one parameter relationship between the acquired model parameters is now formed with the aid of the production model using the method. Thus, the production model creates this parameter relationship and can thus evaluate cross-influences between the captured model parameters or correlate them through the parameter relationship. The next step is to prioritize at least one model parameter of the production model for optimization. The at least one prioritized model parameter can be one of the acquired model parameters, but also a model parameter that has not yet been acquired.

In a final step of the method according to the invention, at least one non-prioritized model parameter is now changed on the basis of the formed parameter relationship to optimize the at least one prioritized model parameter. In other words, the prioritizing step can be used to select the model parameter to be optimized for the film extrusion line when performing the process. For example, if the energy demand of the film extrusion line is prioritized as a model parameter, one or more model parameters of the production model can be changed in the final step so that the prioritized model parameter of the energy demand changes. In the case of energy demand, it must be assumed that a reduction in energy demand is desired, and therefore the optimization of the other model parameters is also aimed at this change in the prioritized model parameter of energy demand.

On the basis of the preceding example, it can be seen that the optimization process can now be computer-aided independently of the film extrusion line. Thus, such a method can now perform an optimization through the parameter relationship of the production model, which can then be implemented with optimized model parameters on the real film extrusion line. If, in the example described above, optimization for a reduced energy requirement leads, for example, to the film extrusion line having to be operated with a changed temperature situation or other raw material parameters, these changed, non-prioritized model parameters are implemented on the real film extrusion line, so that it is highly likely that the optimized design of the prioritized model parameter and, in this example, a reduced energy requirement will now also occur in reality.

Thus, by a method according to the invention, both direct and indirect influences on model parameters are possible. This is therefore a model-based optimization, in particular independent, i.e. offline, of the film extrusion line. Of course, such optimization can be a one-time optimization, but also an ongoing optimization. In particular, the step of modification, but also all steps of the process are performed several times, in particular in an iterative manner.

For example, with the optimization target of more cost-effective, faster and/or lower-energy production, a model parameter of the film product itself, for example the thickness of the film, can now lead to optimization possibilities. In the end result, for example, production of a thicker film would enable cheaper and/or faster and thus more cost-effective production in total.

There may be advantages if, in a method according to the invention, an optimization target and/or an optimization direction is specified when prioritizing the at least one model parameter. This allows to improve the optimization not only with respect to the prioritized model parameter, but also in the direction of the desired optimization. For example, it is possible to specify whether the model parameter should grow or be reduced as part of the optimization loop. In the case of the example of the energy demand of a film extrusion line, for example, it can be specified that the optimization direction is to reduce the energy demand. An optimization target in the sense of a maximum energy demand limit can also be provided, which is to be undercut by the optimization. Thus, falling below or exceeding, depending on the optimization direction, such an optimization target can indicate and predefine not only the direction of the optimization run, but also the end of the optimization. Of course, in addition to an exact limit, the optimization target can also be provided as a target corridor and thus an optimization target corridor.

A further advantage is achievable if, in a method according to the invention, a change limit and/or a direction of change is specified when changing the at least one non-prioritized model parameter. This can ensure that undesirable directions of change are avoided. In particular, a wrong direction of optimization can be avoided. Furthermore, a change limit allows to avoid exceeding this boundary for non-prioritized model parameters in case of the optimization of the prioritized model parameter. For example, in the case of film thickness, falling below a minimum thickness for a particular formulation can have a massive impact on stability during production. If the lower limit for this non-prioritized model parameter is now set during optimization in the form of the thickness of the film, it is ensured that the variation of this non-prioritized model parameter does not leave the stable production range. This default can be given in a manual way, but also by the production model itself. In addition to the change limit, which can of course also be designed as a change corridor, the direction of change can also provide that only an increase or decrease of the non-prioritized model parameter to be changed directs or limits the optimization in the desired way.

Further advantages can be gained if, in a method according to the invention, when at least two different model parameters are prioritized, they are prioritized with different degrees of prioritization. So these different levels of prioritization differ from the value of prioritization, for example, based on two different model parameters, one having a higher prioritization than the other. In particular, complex prioritizations can be built up in this way, which can be combined, for example, with optimization target, optimization directions, change limits and also directions of change. This is only possible in the method according to the invention because a production model forms the core of the method, and in this way even such complex optimization tasks can be taken into account by iterative optimization loops in an optimization method that runs in particular in an automated manner.

It is furthermore advantageous if, in a method according to the invention, at least one model parameter is locked against change when the change is carried out. This makes it possible to exclude individual model parameters from the optimization loop, so that, for example, an undesirable influence on barrier properties, stability properties or color properties is omitted during production of the film product. This can also be done in a manual way or on the basis of an active intervention of the production model. For example, from a stability point of view, a change in color mixing can bring advantages. However, if, as part of the optimization, a change in the color pigments would bring benefits to the prioritized model parameter, this would have an impact on the visual view of the film product. Thus, by locking the model parameter of the color pigment admixture, a change of the same can now be locked, so that the optimization is performed exclusively on the basis of the remaining unlocked model parameters.

It is also advantageous if, in a method according to the invention, the step of changing the at least one non-prioritized model parameter is carried out repeatedly, in particular in an automated manner. In particular, this iterative repetition, especially in an automated manner, will even have an automatic evaluation of an optimization result. The evaluation and redirection of the optimization direction can thus be performed anew at each iterative run, so that a simulation running purely on a computer can perform this optimization. The iterative execution and especially the feedback loop built in for each iteration can further increase the complexity of the desired optimization tasks and further improve the quality of the resulting optimization solutions.

Furthermore, it is advantageous if, in a method according to the invention, an optimization result for the prioritized at least one model parameter is determined, and in particular evaluated, on the basis of the modified at least one non-prioritized model parameter by means of the formed parameter relationship. In other words, there will be an evaluation of the optimization or an evaluation of the result of the optimization. The simulation of the production after the optimization can therefore represent an additional and subsequent simulation to the optimization, and thus verify the result of the optimization, so to speak. The same production model can be used for the simulation of the production as is used for the optimization. In principle, however, it is also conceivable to use a different production model so that, so to speak, two production models check each other against each other, i.e., especially when using two artificial intelligences, these check each other and, through feedback, bring about a further improved optimization result in total.

It is also advantageous if, in a method according to the invention, an at least partially manual selection of the at least one non-prioritized model parameter to be changed is performed. Such a manual specification and in particular also a manual weighting entails the high flexibility desired for a process according to the invention. In particular, this is combined with limits of change and targets of optimization that can also be manually specified.

It is furthermore advantageous if, in a process according to the invention, at least one of the following is selected as the objective of the optimization:

Reduction of energy consumption during production on the film extrusion line,

Reduction of material requirements during production on the film extrusion line, Reduction of costs during production on the film extrusion line, Improvement of at least one output parameters, in particular in the form of a property of the film product.

The above list is not exhaustive. More complex relationships, i.e., prioritization of two or more of the foregoing improvements or reductions, are of course also conceivable within the scope of the present invention.

It can also be advantageous if, in a method according to the invention, a specific film extrusion line is selected on the basis of the optimization of the at least one prioritized model parameter and/or on the basis of the modified at least one non-prioritized model parameter. Film extrusion lines can develop in different directions, especially over the duration of use and the wear that occurs in the process. Thus, for different optimization situations and thus also for different production tasks, one specific film extrusion line may be better suited for production than another. In other words, on just this one specific film extrusion line, production can achieve the optimized benefits in a particularly positive way. In other words, the optimization procedure can additionally support or even additionally perform production planning. This can be used with particular advantages when specific production models are used for specific film extrusion lines for the post-optimization simulations.

Furthermore, it is advantageous if at least one input parameter in the form of a new raw material parameter is used for the optimization in a process according to the invention. If, for example, a new raw material is used for the first time in an existing film extrusion line, this new raw material can only be incorporated into existing recipes and checked for optimization potential with the help of the optimization process. Starting from this raw material, an optimization process according to the invention can therefore be used to design and optimize a new formulation, so to speak, and thus also new film product properties. In particular, this applies in combination with appropriate parameters for this new raw material.

There are further advantages if, in a process according to the invention, at least one output parameter in the form of a new film parameter is used for the optimization. So here we can speak of a design of a new film product based on a film property. In particular, this can be combined with a new raw material parameter according to the preceding paragraph.

Based on this, a new product idea, for example a new barrier property or similar, can be provided with a new formulation in an automatic manner via the optimization process.

Further advantages are achieved if, in a process according to the invention, multiple optimization is performed, in particular with different prioritizations, with a subsequent evaluation of the optimization results. Thus, it is possible to subsequently compare the different optimizations with regard to their optimization results. It is also possible to compare the results with already known and already produced film products, i.e. corresponding historical data. The evaluation of new film products in comparison to known film products is also possible in this way. In sum, automatic or even multiple simulated production or prediction, in particular in both directions, i.e. starting from the raw material and/or starting from the film product in the sense of the present invention, is conceivable in this way.

Also an object of the present invention is a computer program product comprising instructions which, when the program is executed on a computer, cause the computer to perform the steps of a method according to the invention. Thus, a computer program product according to the invention brings the same advantages as have been explained in detail with reference to a method according to the invention.

Further advantages, features and details of the invention are given in the following description, in which, with reference to the drawings, embodiments of the invention are described in detail. The features mentioned in the claims and in the description may be individually or in any combination substantially inventive. They are schematically shown:

DESCRIPTION OF SPECIFIC EMBODIMENTS OF THE INVENTION

Figure 1:
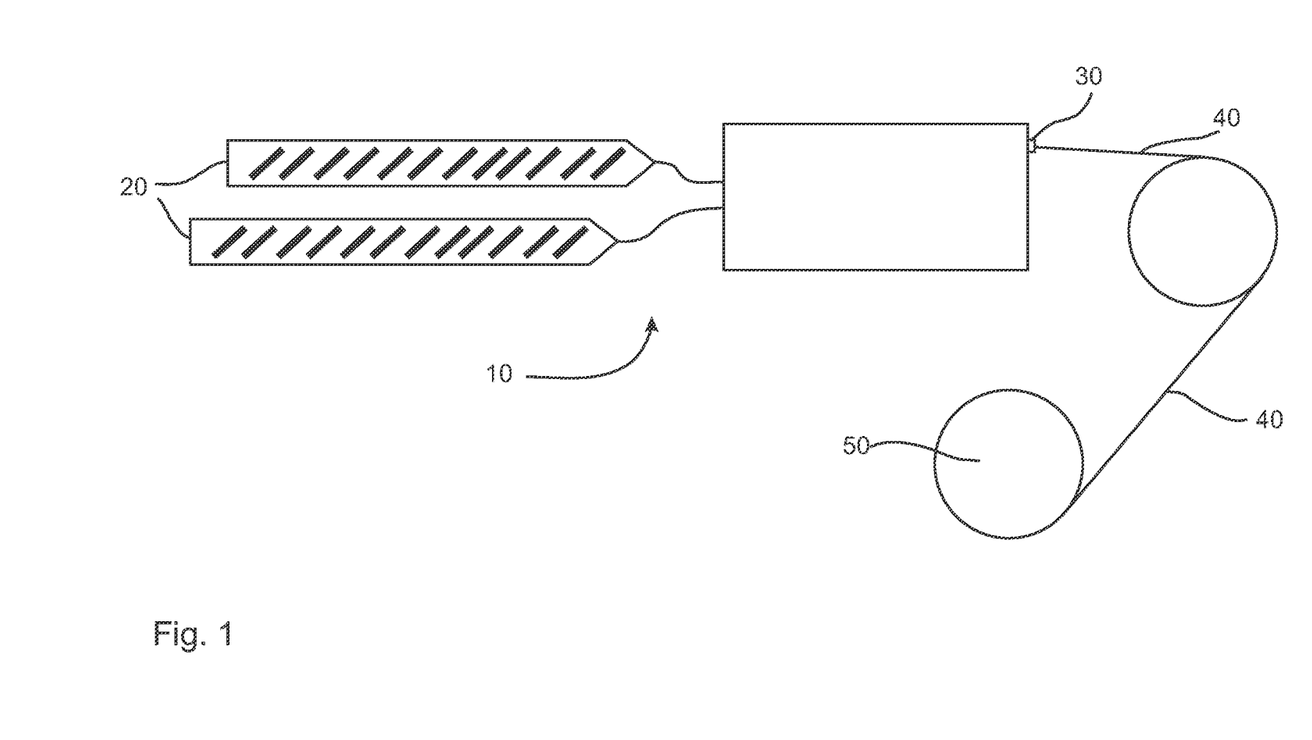
FIG. 1 shows an embodiment of a film extrusion line.
Figure 2:
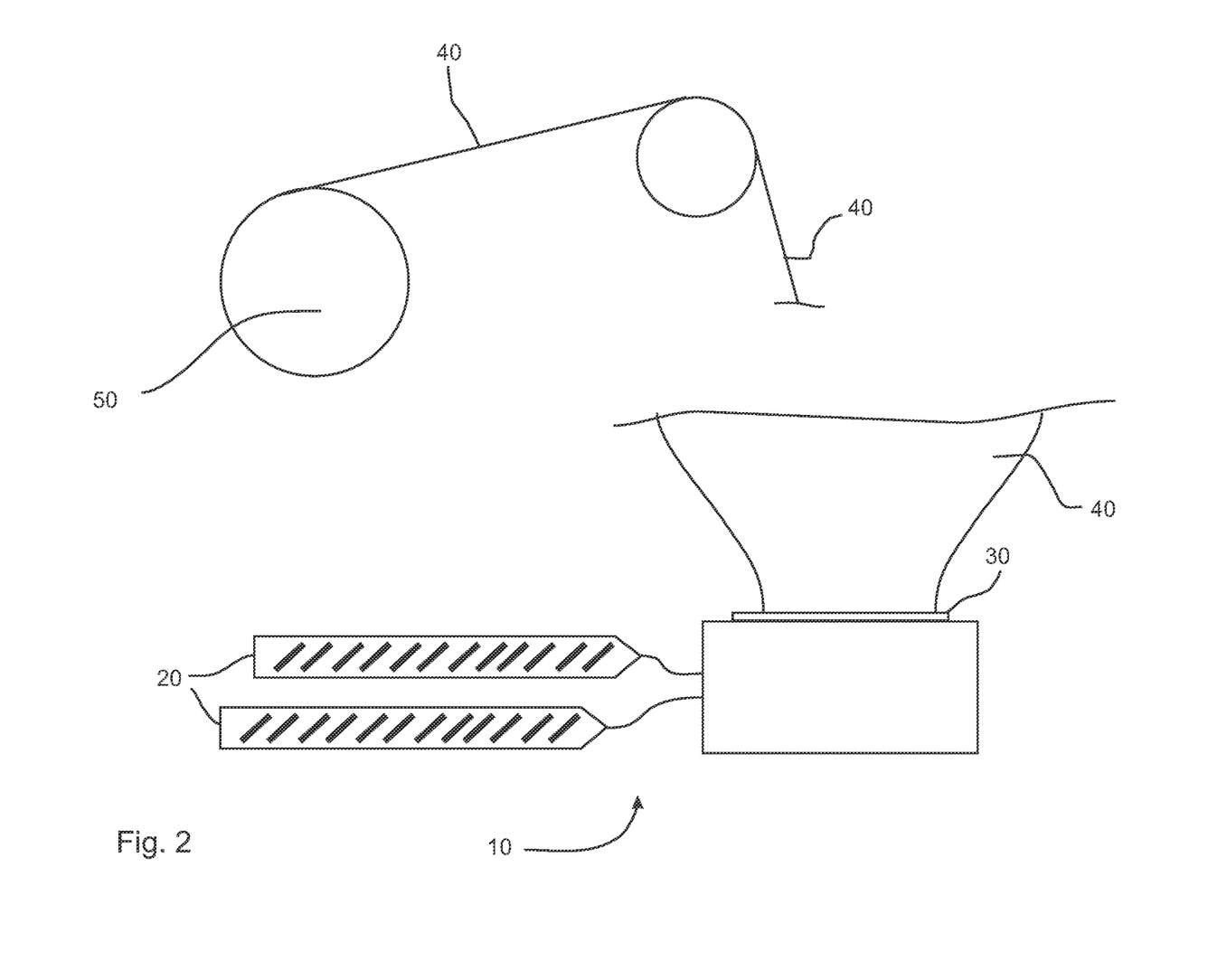
FIG. 2 shows another embodiment of a film extrusion line.

FIGS. 1 and 2 schematically show one possibility of film extrusion lines 10. Thus, FIG. 1 shows a film extrusion line 10 in the form of a flat film extrusion line, which here schematically has two extruders 20. These two extruders 20 provide the corresponding melt to a flat-shaped nozzle 30, through which a film sheet 40 is dispensed and cooled on a chill roll. Finally, this film sheet 40 is wound on a winding roll 50.

In contrast, FIG. 2 shows a blown film device as a film extrusion line 10, which also here has two extruders 20. The extrusion material is melted and fed to a nozzle 30 in a ring shape so that a bubble can be blown up as a film sheet 40. The flattened film sheet 40 is deflected and also rewound on a winding roll 50.

Figure 3:
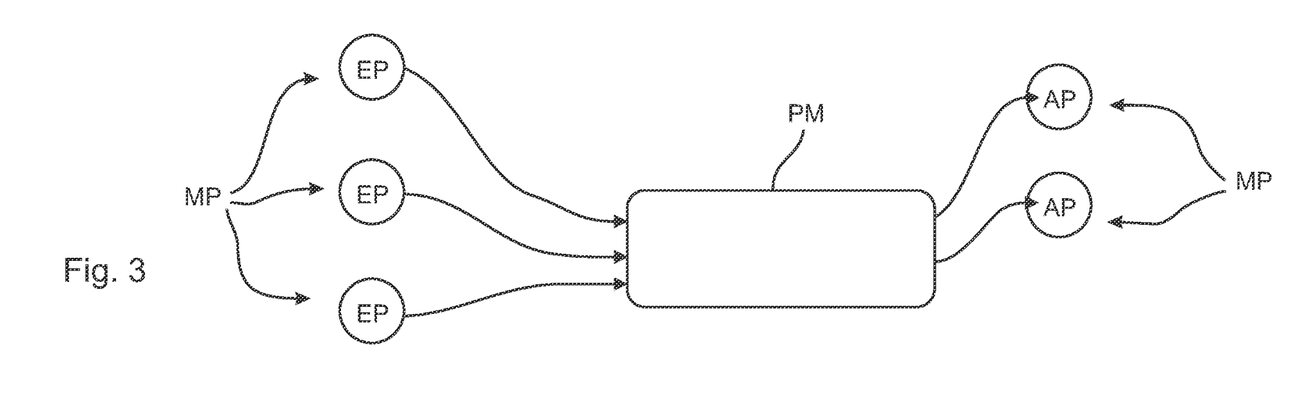
FIG. 3 shows an embodiment of the use of the production model,
FIG. 4 another use of a production model,
FIG. 5 a representation of an optimization target and
FIG. 6 a representation of a change limit.
Figure 4:
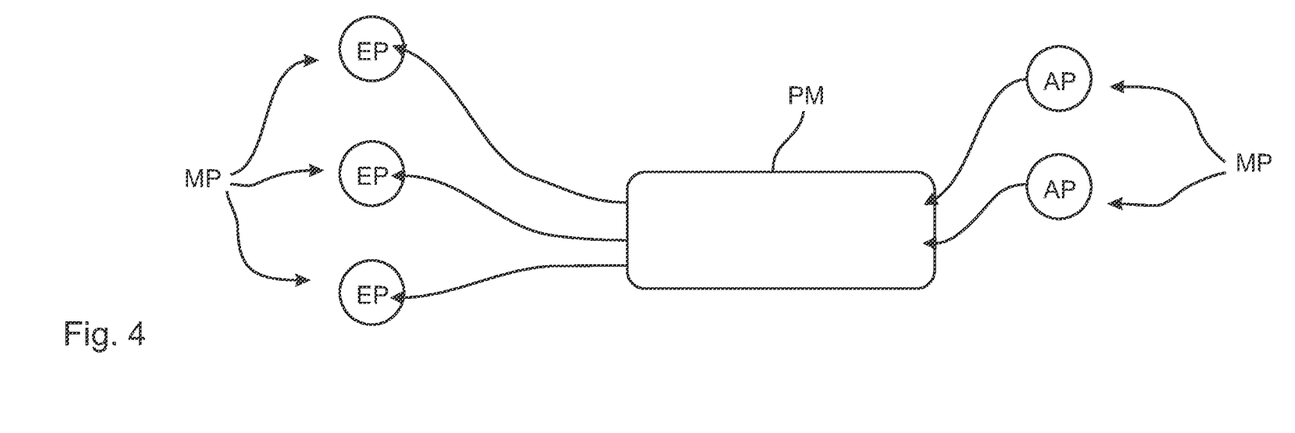

FIGS. 3 and 4 show schematically how input parameters EP are now linked to output parameters AP in a production model. For example, the production model PM may have artificial intelligence, an empirical simulation model, and/or an algorithmic simulation model. In particular, the production model PM is designed bidirectionally even multidirectionally, so that the linkage according to FIG. 3 can be provided from left to right or according to FIG. 4 from right to left or also in a combined manner for different directions of the model parameters MP.

In order to now be able to perform an optimization during production on a film extrusion line 10, the optimization is performed by specifying at least one model parameter MP to be optimized and thus prioritized. After selecting prioritization of model parameter MP, non-prioritized model parameters MP are changed until the prioritized model parameter MP has moved in a desired direction or to a desired destination.

Figure 5:
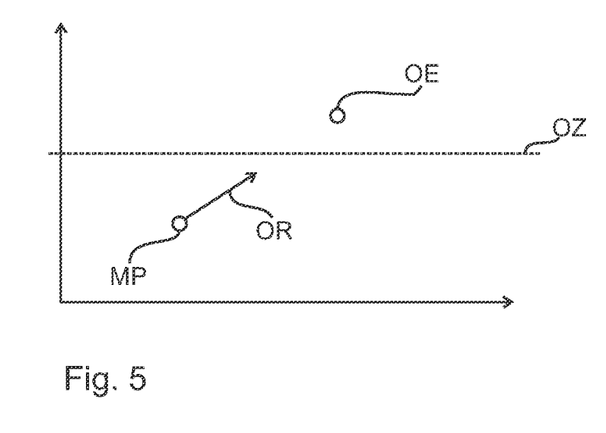

FIG. 5 shows a criterion for such an optimization. Over several optimization runs, a model parameter MP is to be optimized from a starting point towards an optimization direction OR. The optimization direction in FIG. 5 indicates that the data of the model parameter MP should increase. The optimization direction OR can additionally or alternatively be given by an optimization target OZ, which is able to provide the limit which the model parameter MP should exceed along the optimization direction OR. FIG. 5 also shows the optimization result OE, which is above the optimization target OZ. Exceeding the optimization target OZ can also be defined as a termination criterion to end the optimization accordingly.

Figure 6:
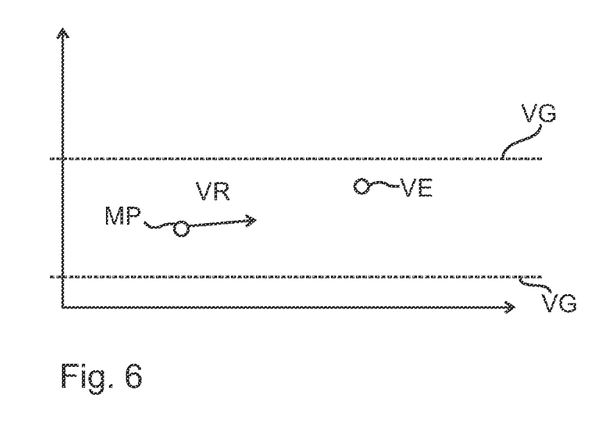

FIG. 6 can be used additionally or alternatively for optimization and refers to model parameters MP that are not prioritized and thus changed. Thereby also the change shall be provided for example with a direction of change VR, where here the model parameter MP shall increase along a change direction VR as well. In addition, a corridor is provided here, with change limits VG, which should not be exceeded and fallen short of. FIG. 6 also shows an example of a slightly increased added value for the model parameter MP as a change result VE.

The preceding explanation of the forms of embodiments describes the present invention exclusively in the context of embodiments. Of course, individual features of the embodiments can be freely combined with each other, if technically reasonable, without leaving the scope of the present invention.

REFERENCE SIGN LIST

10 Film extrusion line
20 Extruder
30 Nozzle
40 Film sheet
50 Winding roll

PM Production model
MP Model parameter
EP Input parameter
EL Input list
AP Output parameters
AL Output list
OZ Optimization target
OR Optimization direction
OU Optimization result
VG Change limit
VR Direction of change
VE Change result

The invention claimed is:

1. A method for optimizing production of a film product on a film extrusion line, the method comprising:
acquiring, during operation of the film extrusion line, model parameters related to the production of the film product, wherein said model parameters include one or more of:
at least two input model parameters comprising raw material parameters, and
at least two output model parameters comprising film product parameters;
forming a parameter relationship between the acquired model parameters using a production model specific to the film extrusion line;
prioritizing at least one model parameter of the production model for optimization; and
modifying at least one non-prioritized model parameter of the production model based on the formed parameter relationship to optimize the prioritized model parameter;
optimizing the prioritized model parameter using the optimization target or the optimization direction specified; and
using the optimized model parameter in a production of the film product on the film extrusion line;
wherein at least an optimization target or an optimization direction is specified in the prioritization of the at least one model parameter.

2. The method according to claim 1, wherein at least an optimization target or an optimization direction is specified in the prioritization of the at least one model parameter.

3. The method according to claim 1, wherein at least a change limit or a direction of change is specified for the change of the at least one non-prioritized model parameter.

4. The method according to claim 1, wherein when prioritizing at least two different model parameters, these are prioritized with different degrees of prioritization.

5. The method according to claim 1, wherein at least one model parameter is locked against change when the change is carried out.

6. The method according to claim 1, wherein the step of changing the at least one non-prioritized model parameter is performed repeatedly.

7. The method according to claim 1, wherein the step of changing the at least one non-prioritized model parameter is performed repeatedly in an automated manner.

8. The method according to claim 1, wherein an optimization result for the prioritized at least one model parameter is determined, on the basis of the modified at least one non-prioritized model parameter by means of the parameter relationship formed.

9. The method according to claim 8, wherein an optimization result for the prioritized at least one model parameter is determined and evaluated, on the basis of the modified at least one non-prioritized model parameter by means of the parameter relationship formed.

10. The method according to claim 1, wherein an at least partially manual selection of the at least one non-prioritized model parameter to be changed is performed.

11. The method according to claim 1, wherein at least one of the following is selected as the objective of the optimization:
Reduction of energy consumption during production on the film extrusion line,
Reduction of material requirements during production on the film extrusion line,
Reduction of costs during production on the film extrusion line,
Improvement of at least one output parameter.

12. The method according to claim 11, wherein at least one of the following is selected as the objective of the optimization:
Improvement of at least one output parameter in the form of a property of the film product.

13. The method according to claim 1, wherein a selection of a specific film extrusion line is made at least on the basis of the optimization of the at least one prioritized model parameter or on the basis of the modified at least one non-prioritized model parameter.

14. The method according to claim 1, wherein at least one input parameter in the form of a new raw material parameter is used for the optimization.

15. The method according to claim 14, wherein a multiple optimization is performed with a subsequent evaluation of the optimization results.

16. The method according to claim 15, wherein a multiple optimization with different prioritizations is performed with a subsequent evaluation of the optimization results.

17. The method according to claim 1, wherein at least one output parameter in the form of a new foil parameter is used for the optimization.

18. A non-transitory computer program product comprising instructions which, when the program is executed on a computer, cause the computer to perform the steps of a method having the features of claim 1.

* * * * *